No. 733,151. Patented July 7, 1903.

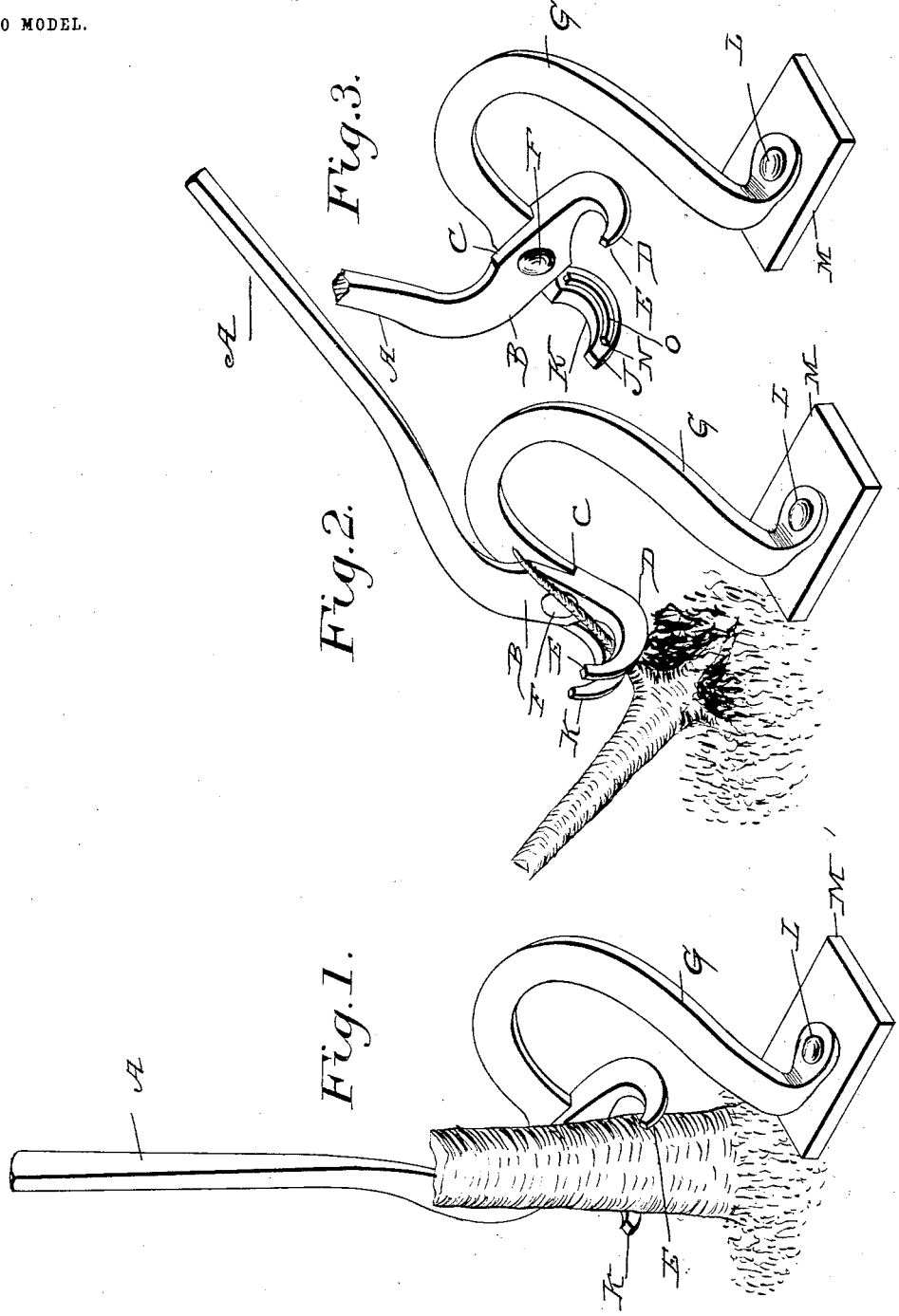

UNITED STATES PATENT OFFICE.

WILLIAM S. CHILTON, OF SPRINGBORO, OHIO.

STUMP-EXTRACTOR AND GRUBBER.

SPECIFICATION forming part of Letters Patent No. 733,151, dated July 7, 1903.

Application filed July 9, 1902. Serial No. 114,923. (No model.)

*To all whom it may concern:*

Be it known that I, WILLIAM S. CHILTON, a citizen of the United States, residing at Springboro, in the county of Warren and State of Ohio, have invented certain new and useful Improvements in Stump-Extractors and Grubbers, of which the following is a specification.

My invention relates to improvements in grubbers and stump-extractors; and one object of my invention is the provision of a device which will remove the stump by grasping the body thereof or which will extract the stump by the roots, according to the circumstances.

Another object of my invention is the provision of a device which can be used for grubbing or pulling sprouts or for handling tender plants and for removing undergrowths in an efficient manner.

Another object of my invention is the provision of a stump-extractor which will be of simple, durable, and inexpensive construction and which will be thoroughly efficient and practical.

With these objects in view my invention consists of a stump-extractor embodying novel features of construction and combination of parts substantially as disclosed herein.

Figure 1 represents a perspective view of my device extracting a stump by the body or trunk. Fig. 2 represents a similar view removing the stump by the roots. Fig. 3 represents a perspective view of the device.

In the drawings, A designates the handle of my device, which is inclined and has the lower end or arm B, which is recessed or shouldered at C and is formed with the offset jaw D, which terminates in a hook E. The arm B is fulcrumed at F, the bail or staple shaped frame G, which is formed with the clamping-jaw J, having the hook K similar to the hook E of the other jaw. The other section of this bail-shaped frame is formed with a fork or foot L, which can rest in the earth or which will be secured to the block M and forms a support when the extractor is in use.

To render my device efficient in grubbing or handling delicate plants, I form the jaws with a cavity or recess N, in which I place yielding or elastic cushions O, which will not injure the plants when brought in contact with them.

It will be understood from the drawings and description how my extractor is used, and it is apparent that the jaws will clamp the trunk of the stump and by pressing down on the lever or handle will extract the stump bodily. When only the roots of the stump can be seen, the hook will pass under the roots and the stump can be extracted with ease, and these are the important advantages of my device.

The bail-shaped frame, it will be noted, has a foot which is rigidly secured to the base, and the frame extends upward and rearward at a lateral incline from the base, this permitting the device to be brought close to the tree or plant or to be manipulated in small spaces where the device could not be used if the frame were arranged vertically or inclined in the opposite direction. In other words, this arrangement of frame permits the device to be used in small places to get close to the tree or shrub when it may be near a fence, rock, or other obstruction, and this is a very important feature.

I claim—

The grubber and stump-extractor herein shown and described, consisting of the horizontal base, the bail-shaped frame having its lower end rigidly secured to said base, said frame extending upwardly and rearwardly at an incline to said base and thence forwardly and having said forward end formed with a clamping-jaw, the lever-handle pivoted to the frame and having a clamping-jaw similar to the jaw of the frame, the pivot being arranged adjacent to said jaws.

In testimony whereof I affix my signature in presence of two witnesses.

WILLIAM S. CHILTON.

Witnesses:
C. W. GROVE,
DAVID GEPHART.